April 15, 1952     H. O. THOMAS     2,593,219
OIL SEAL STRUCTURE
Filed Sept. 15, 1949
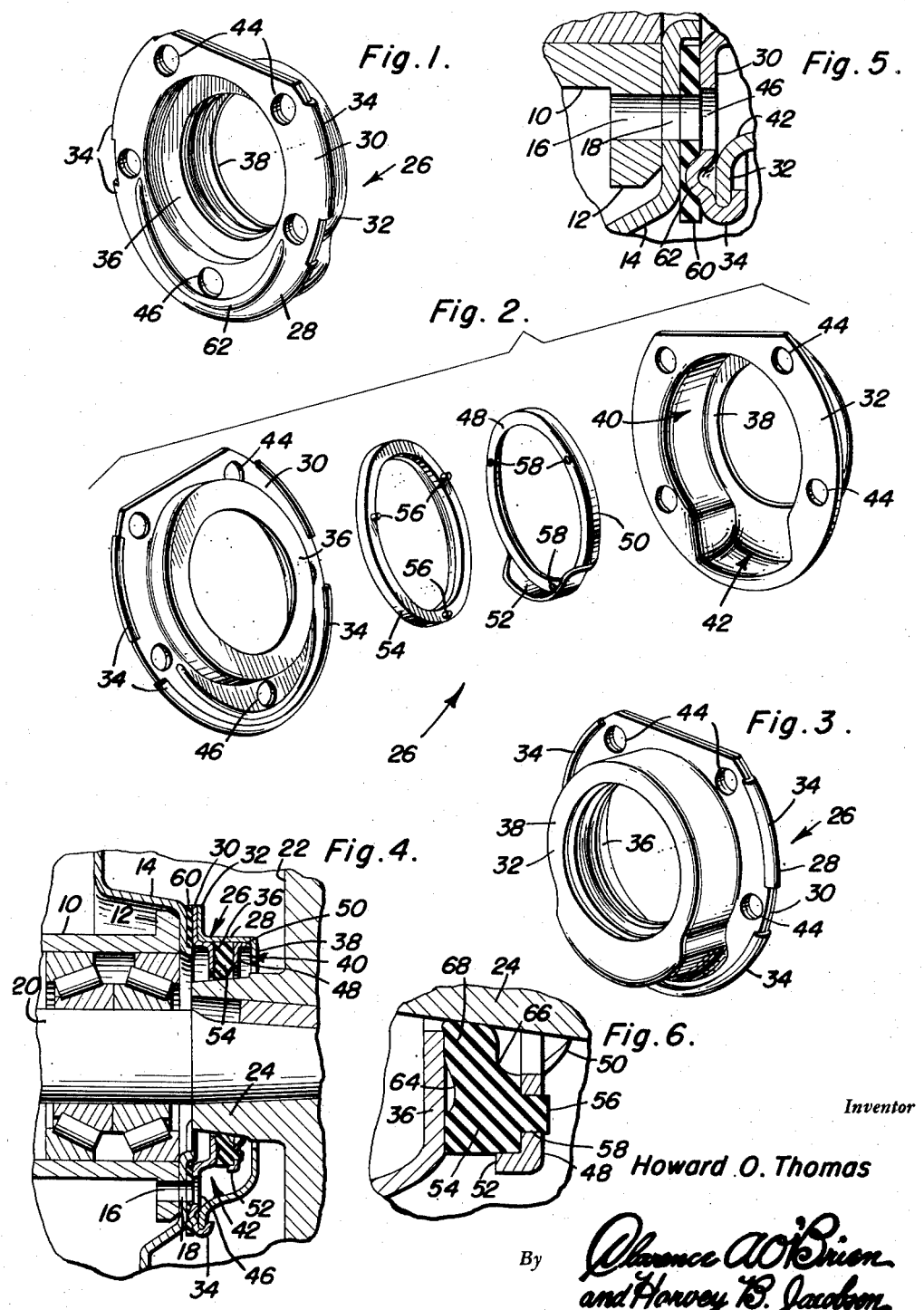
Inventor
Howard O. Thomas Patented Apr. 15, 1952

2,593,219

UNITED STATES PATENT OFFICE 2,593,219

OIL SEAL STRUCTURE

Howard O. Thomas, South Gate, Calif.

Application September 15, 1949, Serial No. 115,884

1 Claim. (Cl. 288—3)

1

This invention relates to new and useful improvements and structural refinements in oil seals for rear axles of motor vehicles such as automobiles or the like, and the principal object of the invention is to prevent lubricant in the rear axle housing from gaining entry into the brake drum and damaging or otherwise affecting proper operation of the brake shoes by soaking into the brake lining.

In particular, this invention relates to certain improvements and modifications made in the subject matter of my copending patent application, Serial No. 72,656, filed on January 25, 1949, the primary feature of the instant invention residing in the construction of the shield of the oil seal, while another feature lies in the structure of the oil seal unit itself.

Some of the advantages of the invention reside in its simplicity of construction, and in its adaptability to convenient servicing and economical manufacture.

With the above more important objects and features in view and such other objects and features as may become apparent as this specification proceeds, the invention consists essentially in the arrangement and construction of parts as illustrated in the accompanying drawings, in which:

Figure 1 is an inside perspective view of the invention;

Figure 2 is an exploded perspective view thereof;

Figure 3 is an outside perspective view of the same;

Figure 4 is a fragmentary cross-sectional view showing the invention in situ on an automotive rear axle;

Figure 5 is a fragmentary cross-sectional detail illustrating the lower portion of Figure 4 on an enlarged scale; and Figure 6 is a fragmentary cross-sectional view on an enlarged scale, showing the engagement of the oil seal element with the hub of the brake drum.

Like characters of reference are employed to designate like parts in the specification and throughout the several views.

Referring now to the accompanying drawings in detail, the reference character 10 designates an end portion of the usual rear axle housing of a motor vehicle, such as an automobile, the end of the housing being provided with an outturned flange 12 to which is rigidly secured a brake support 14 by means of a plurality of bolt and nut assemblies (not shown) receivable in registering apertures 16, 18 with which the flange and the brake support, respectively, are provided.

An axle shaft 20 is rotatably journaled in the housing 10 and projects outwardly therefrom in order to carry a brake drum 22 provided with an inwardly projecting hub 24 whereby the brake drum is mounted on the axle shaft, as shown.

The invention is embodied in an oil seal structure designated generally by the reference character 26, this consisting of a shield 28 comprising juxtaposed inner and outer plates 30, 32, respectively, marginal edge portions of the inner plate 30 being turned over or doubled upon the outer plate as indicated at 34, whereby the two plates are rigidly secured together.

It is to be noted that an intermediate annular portion of the inner plate 30 is outwardly offset, as at 36, while the intermediate annular portion of the outer plate 32 is outwardly offset, as at 38, so as to define an annular chamber 40 in the shield 28 and a grease-receiving pocket 42 at the bottom of the chamber, as is best shown in Figure 4.

The plates 30, 32 of the shield 28 are provided with registering apertures 44 which are intended to register with the apertures 16, 18 so that suitable fastening elements may be inserted in the registering apertures for the purpose of securing the entire oil seal structure to the brake support 14 and to the housing 10.

However, the aperture in the bottom portion of the inner plate 30 which communicates with the interior of the oil shield, that is, with the drain pocket 42, does not receive a fastening element, and, accordingly, any lubricant which may escape into the chamber 40 and drain into the pocket 42 will be expeditiously and efficiently discharged through the bottom apertures 46, 18 and 16 onto the ground, without causing any damage to the brake lining.

The oil seal unit which is employed in the structure involves the provision of an annular retainer 48 having upper and side portions thereof provided with an outturned flange 50 to engage the inner surface of the outer plate 32, while the bottom portion of the retainer 48 is equipped with an inturned flange 52 which, in effect, constitutes an axially twisted continuation of the flange 50.

An annular sealing element 54 of resilient material is provided between the retainer 48 and the outwardly offset portion 36 of the plate 30, the element 54 being intended to frictionally engage the hub 24 of the drum 22 and being supported by the flange 52 of the retainer 48. Rotation of the element 54 is prevented by providing the element with a set of outwardly projecting pins 56 which are receivable in suitable apertures 58 provided in the retainer 48, as is best shown in Figure 6.

In order to prevent any possible leakage between the shield 28 and the brake support 14, a suitable gasket 60 is positioned between the brake support and the inner plate 30 of the oil seal structure and an inwardly projecting, arcuate rib 62 is formed on the inner surface of the lower portion of the inner plate 30 as is best shown in Figure 5, this rib being intended to embed itself into the gasket 60, so that the possibility of leakage is virtually non-existent.

The sealing element 54 is preferably provided with a pair of annular grooves 64, 66 (see Figure 6) defining therebetween an annular rim 68, so to speak, which frictionally engages the hub 24 and, by virtue of the grooves 64, 66, is sufficiently resilient to become "rolled" inwardly when the hub is applied thereto, so that it may subsequently have a tendency to roll back outwardly and properly engage the hub notwithstanding enlargement thereof by wear.

It is believed that the advantages and use of the invention will be clearly apparent from the foregoing disclosure, and accordingly, further description thereof at this point is deemed unnecessary.

Having described the invention, what is claimed as new is:

A rear axle oil seal of the type described, comprising a vertically disposed inner plate adapted to be secured to a brake support and provided with an axle receiving opening, a vertically disposed outer plate secured to the outer surface of the inner plate and having an outwardly offset intermediate and lower portions spaced from the inner plate to afford a chamber therebetween and a grease collecting pocket at the bottom of said chamber, the intermediate portion of said outer plate having an opening therein to receive a hub on an axle, said inner plate being provided in its lower portion with a grease drain port communicating with said pocket, and an annular seal unit mounted in said chamber to frictionally engage a hub in a vertical plane spaced inwardly from said outer plate, whereby any grease leaking through said seal unit into said chamber may gravitate into said pocket and drain through said port, said seal unit comprising an annular sealing element positioned against the outer surface of said inner plate, an annular retainer positioned against the outer surface of said sealing element, an outturned flange provided at the top and sides of said retainer and abutting the inner surface of said outer plate, an inturned flange provided at the bottom of said retainer and constituting a reversed continuation of said outturned flange, the lower edge portion of said sealing element resting on and being supported by said inturned flange, and means for preventing rotation of said sealing element relative to said retainer.

HOWARD O. THOMAS.

REFERENCES CITED

The following references are of record in the file of this patent:

UNITED STATES PATENTS

| Number | Name | Date |
| --- | --- | --- |
| 1,227,543 | Limpp | May 22, 1917 |
| 1,270,776 | Boomershine | July 2, 1918 |
| 1,417,410 | Ram | May 23, 1922 |
| 1,624,852 | Trautner | Apr. 12, 1927 |
| 1,872,788 | Mulhern | Aug. 23, 1932 |
| 2,199,880 | Elliott | May 7, 1940 |
| 2,286,472 | Delaval-Crow | June 16, 1942 |
| 2,371,952 | Cox | Mar. 20, 1945 |
| 2,441,844 | Rhoads | May 18, 1948 |